US006563120B1

(12) United States Patent
Baldwin et al.

(10) Patent No.: US 6,563,120 B1
(45) Date of Patent: May 13, 2003

(54) FLEXIBLE RADIATION DETECTOR SCINTILLATOR

(75) Inventors: Charles E. Baldwin, Florence, KY (US); Craig Caris, Crittenden, KY (US)

(73) Assignee: Ronan Engineering Co., Woodland Hills, CA (US)

( * ) Notice: Subject to any disclaimer, the term of this patent is extended or adjusted under 35 U.S.C. 154(b) by 0 days.

(21) Appl. No.: 10/091,970

(22) Filed: Mar. 6, 2002

(51) Int. Cl.[7] .............................................. G01T 1/203
(52) U.S. Cl. ................ 250/367; 250/361 R; 250/483.1; 250/486.1; 250/488.1
(58) Field of Search .......................... 250/483.1, 485.1, 250/486.1, 487.1, 488.1, 361 R, 367

(56) References Cited

U.S. PATENT DOCUMENTS

| 4,362,946 A | 12/1982 | Cusano et al. |
| 4,560,882 A | 12/1985 | Barbaric et al. |
| 4,749,863 A | 6/1988 | Casey et al. |
| 4,788,436 A | 11/1988 | Koechner |
| 4,893,020 A | 1/1990 | Ono |
| 5,006,714 A | 4/1991 | Attix |
| 5,420,959 A | 5/1995 | Walker et al. |
| 5,583,343 A * | 12/1996 | Dilmanian et al. ...... 250/475.2 |
| 5,606,638 A | 2/1997 | Tymianski et al. |
| 5,635,717 A * | 6/1997 | Popescu .................... 250/368 |
| 6,151,769 A | 11/2000 | Bliss et al. |

\* cited by examiner

*Primary Examiner*—Constantine Hannaher
*Assistant Examiner*—Timothy Moran
(74) *Attorney, Agent, or Firm*—Glenn D. Bellamy; Greenebaum Doll & McDonald PLLC

(57) ABSTRACT

Shown is a flexible scintillator, or scintillation-type level detector, in which the scintillator is made from a plurality of elongated, relatively thin layers of plastic scintillator material stacked in close proximity to one another in a slidable relationship to provide flexibility in at least two dimensions. The layers of at least one end are aligned for operable connection to a photodetector. Optionally, an anti-friction material, such as PTFE, may be placed between layers of the plastic scintillator material. Edge and outer face surfaces of the layers of the scintillator material may be covered with an inwardly facing light reflective material and/or light-excluding material.

28 Claims, 4 Drawing Sheets

FLEXIBLE RADIATION DETECTOR SCINTILLATOR

TECHNICAL FIELD

This invention relates to a flexible scintillator for use with a nuclear (radiation-type) level detector. More particularly, the invention relates to a flexible scintillator made of an elongated stack of relatively thin layers of plastic scintillator material which may be operably connected at an end to a photodetector.

BACKGROUND OF THE INVENTION

It is well known to use the combination of a radiation source, such as Cesium$^{137}$ and an elongated radiation detector as a device for measuring the level of material, such as in a tank, that is situated between the radiation source and radiation detector. Such devices are particularly useful when the material being measured is particularly caustic, dangerous, or otherwise not amenable to traditional level measurement devices.

Early continuous level detection devices used an ion chamber detector. For example, the ion chamber could be a four to six inch diameter tube up to 20 feet long filled with inert gas pressurized to several atmospheres. A small bias voltage is applied to a large electrode inserted down the center of the ion chamber. As gamma energy strikes the chamber, a very small signal (measured in picoamperes) is detected as the inert gas is ionized. This current, which is proportional to the amount of gamma radiation received by the detector, is amplified and transmitted as the level measurement signal.

Alternatively, elongated scintillation detector "crystals" have been used. Such devices are many times more sensitive than ion chambers and are also considerably more expensive. This added expense is often acceptable because it allows the use of either a smaller radiation source size or to obtain a more sensitive gauge. When gamma energy hits the scintillator material, it is converted into visible or UV flashes comprised of light photons (particles of light). These photons increase in number as the intensity of gamma radiation increases. The photons travel through the scintillator medium to a photomultiplier tube, which converts the light photons into an electrical signal. The output is directly proportional to the gamma energy that is striking the scintillator.

Both ion chamber detectors and scintillation counter detectors have the disadvantage of being quite rigid in structure. In some applications, such as extending the detector vertically along the length of a tank, the shape of the tank or obstructions which are on or part of the tank limit or prevent the use of such detectors. There is a need for a scintillation counter detector that is flexible so that it may be adapted in the field to bend around such obstacles.

Fiber optic cables made of many individually clad strands of scintillator material have been presented as a solution to this problem. The required individual cladding of these fibers, however, makes such a solution undesirably costly.

SUMMARY OF THE INVENTION

The present invention provides a flexible scintillator, or flexible radiation-type level detector, in which a plurality of elongated, relatively thin layers of plastic scintillator material are stacked in close proximity to one another in a slidable relationship. The stack will have first and second ends, at least one of which is aligned for operable connection to a photodetector. Such a scintillator is flexible in at least two dimensions.

According to more particular aspects of the invention, the plastic scintillator material may include polyvinyltoluene and an anti-friction material, such as a film of polytetrafluoroethylene, may be added between layers of the plastic scintillator material.

Also in preferred form, edge and outer face surfaces of the layers of scintillator material may be covered with an inwardly-facing light reflective material and/or a light-excluding material.

Other aspects and features of the present invention will be noted upon examination of the drawings, description of the best mode for carrying out the invention, and claims, all of which constitute disclosure of the present invention.

BRIEF DESCRIPTION OF THE DRAWING

Like-reference numerals are used to represent like parts throughout the various figures of the drawing wherein.

BEST MODE FOR CARRYING OUT THE INVENTION

Figure 1:
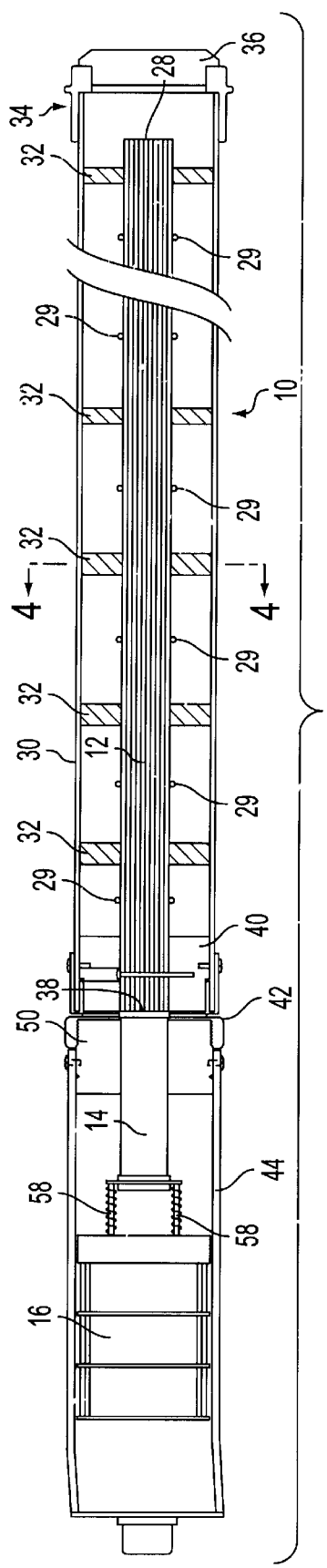
FIG. 1 is a longitudinal sectional view of a radiation-type level detector which includes a flexible scintillator according to a preferred embodiment of the invention.

Referring now to the various figures of the drawing, and first to FIG. 1, therein is shown at 10 a flexible radiation-type level detector according to a preferred embodiment of the present invention. The device 10 includes a flexible scintillator 12 operably connected at an end to a photomultiplier tube 14 which acts as a photodetector. As is well known in the art, the flexible scintillator 12 includes a scintillator material which, when hit with gamma energy, produces flashes comprised of light photons (particles of light). The scintillator 12 is operably connected to a photomultiplier tube 14 of well-known construction. The level of light photons produced by the scintillator 12 is directly proportional to the gamma energy that is striking the scintillator 12. Likewise, the output of the photomultiplier tube 14 is directly proportional to the number of photons it detects from the scintillator 12. The device 10 further may include an electronic amplifier 16, also of well-known construction, which produces a signal output in 10 volt pulses.

Figure 3:
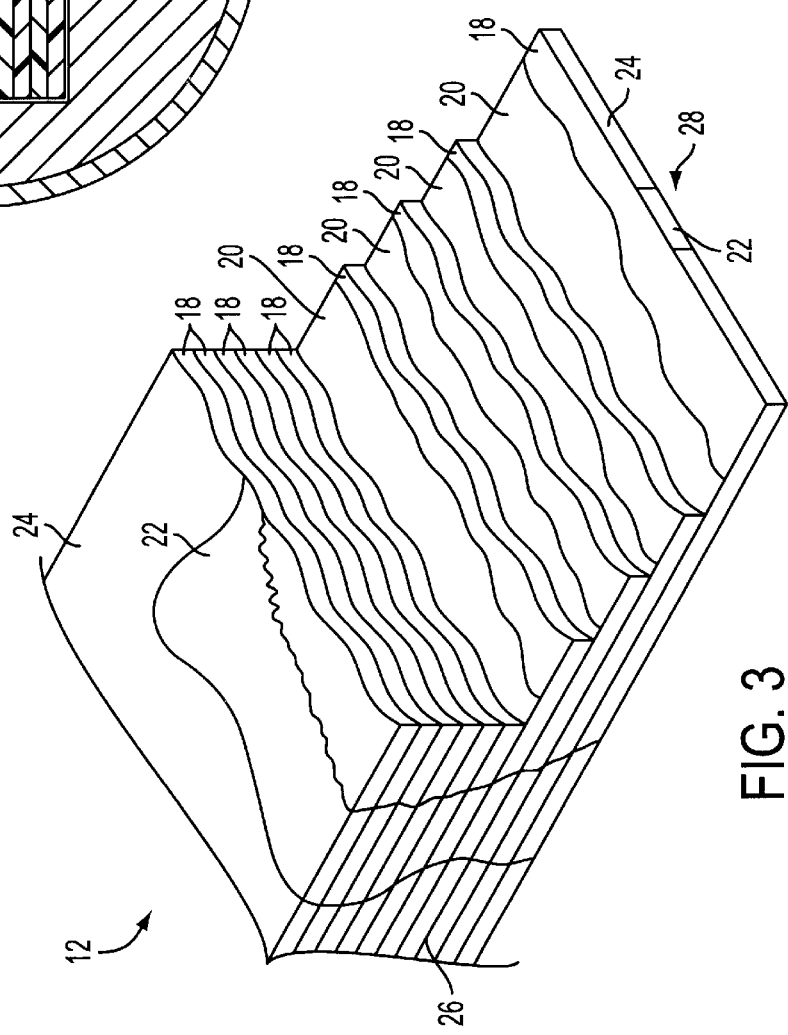
FIG. 3 is a fragmentary, partially cut-away pictorial view of the laminate stack of scintillating polymer material arranged according to a preferred embodiment of the present invention.

Referring now to FIG. 3, therein is shown a fragmentary, partially cut-away pictorial view of a laminate stack which comprises a preferred embodiment of the flexible scintillator 12 of the present invention. The laminate stack may be a plurality of elongated, relatively thin layers of a scintillating plastic polymer material, such as polyvinyltoluene (PVT). A preferred PVT plastic scintillator material is available from Bicron Business Unit (d/b/a Bicron) of Saint-Gobain Industrial Ceramics, Inc. in Newbury, Ohio, catalog number BC-408. These layers 18 may be cut from a relatively larger or thicker block of PVT material. The more smooth the surfaces of each layer 18, the more efficient the transmission of photons through the scintillator 12 to the photomultiplier tube 14. A preferred method for cutting the PVT block into relatively thin pieces is to use a commercially available high pressure water stream cutting device. This method can produce a laminate stack of layers that is about 98% as efficient a solid, uncut block of scintillator material having similar dimensions. However, even cutting the material with a traditional band saw and sanding the cut surface smooth can produce acceptable results. A laminate stack produced by this method was found to be about 75% efficient.

Between each layer of scintillation material 18 there may be included an anti-friction material such as a thin (0.010 inches) film of polytetrafluoroethylene (PTFE), sometimes referred to by the DuPont trademark TEFLON®. The PTFE film layers prevent scratching caused by bending of the laminate stack which could result in a degradation of photon conduction efficiency. The entire bundle of PVT laminates 18 and PTFE film may then be wrapped in a foil 22 which provides a mirror-like finish to the inside for internal light pulse reflection. This then may be covered with a thick (10 mil) black tape 24 to eliminate ambient light intrusion. After the bundle is foiled and taped, the foil 22 and tape 24 is slit along the sides 26 and free end 28 between each of the laminates 18 in order to allow the laminate layers 18 to slide relative to one another without scratching as the bundle is bent. A series of elastic bands, such as o-rings 29, may be placed at intervals along the length of the scintillator stack 12 in order to keep the layers tightly bound.

In preferred form, the scintillator 12 is encased in a flexible tubular housing 30. A product that may be deemed suitable for this purpose is sold by Electri-Flex Company of Roselle, Ill. under the trademark LIQUATITE®. This material is a spiral-wound metallic conduit that is covered with a water-tight/light-tight plastic sheath. Other types of water-tight/light-tight flexible tubing may also be suitable. A three-inch inside diameter flexible casing may be used along with a flexible laminate stack scintillator 12 that is approximately one inch in thickness and two inches in width. The scintillator 12 may be centered within the tubular housing with a series of spacer blocks 32. The blocks may be made of PVC or similar plastic material. Alternatively, the space within the casing 30 and around the scintillator 12 may be filled with a foam or sponge material, such as a closed cell neoprene-blended elastomer. A material that may be suitable is sold by Rubberlite, Inc. of Huntington, W. Va. under the stock number SCE42B. This product is a blend of neoprene, ethylenepropylenediene monomer (EPDM), and styrene butadiene elastomers (SBR). The free end 34 of the casing 30 may be closed with a water-tight/light-tight cap 36 which may be particularly manufactured for connection to a sheathed, spiral-wound metallic casing 30. Other flexible casing and filler materials may be suitable depending on the particular application in which the device 10 is intended.

Figure 5:
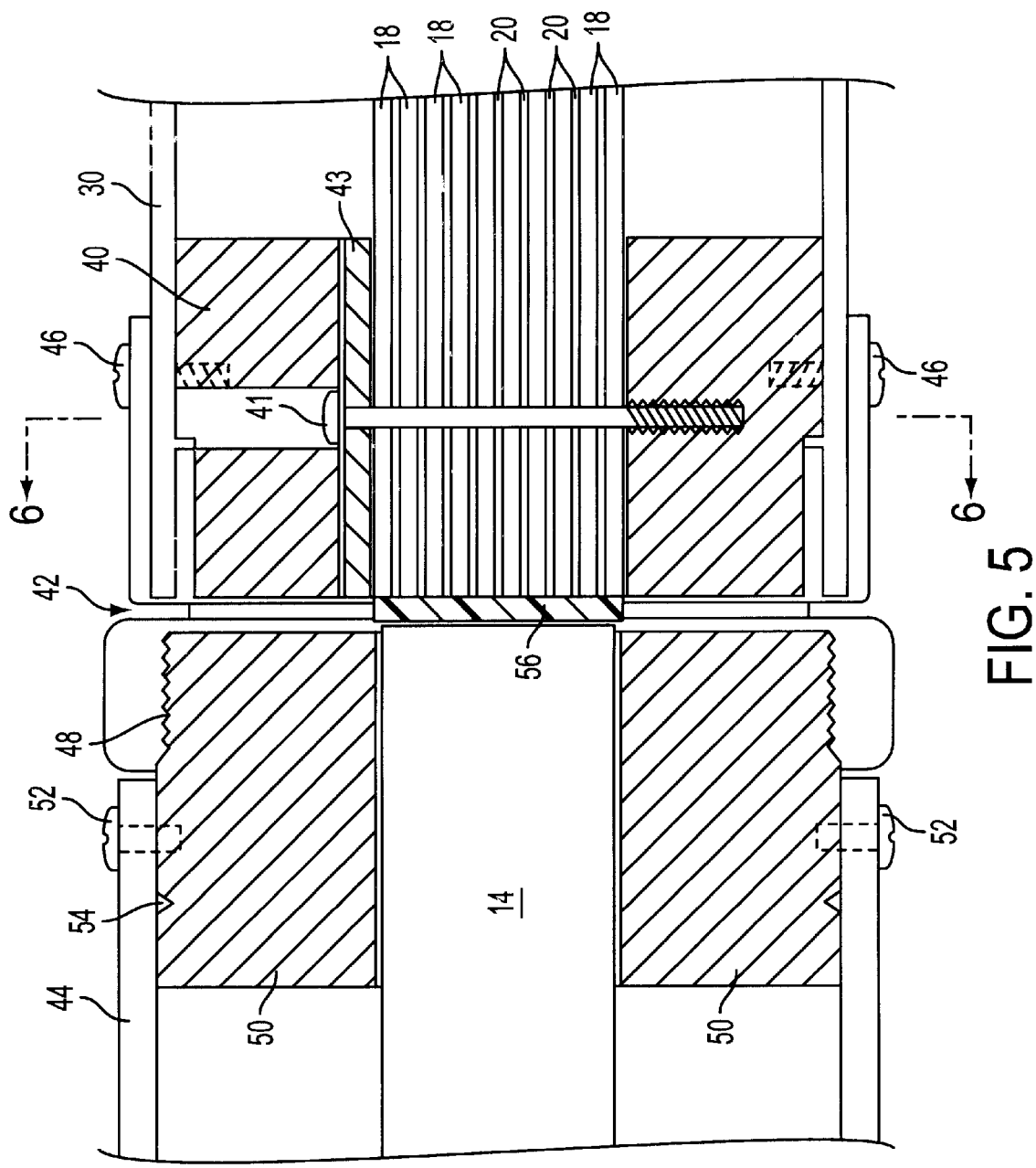
FIG. 5 is an enlarged longitudinal sectional view of a preferred connection between a flexible scintillator of the present invention and a photodetector.
Figure 6:
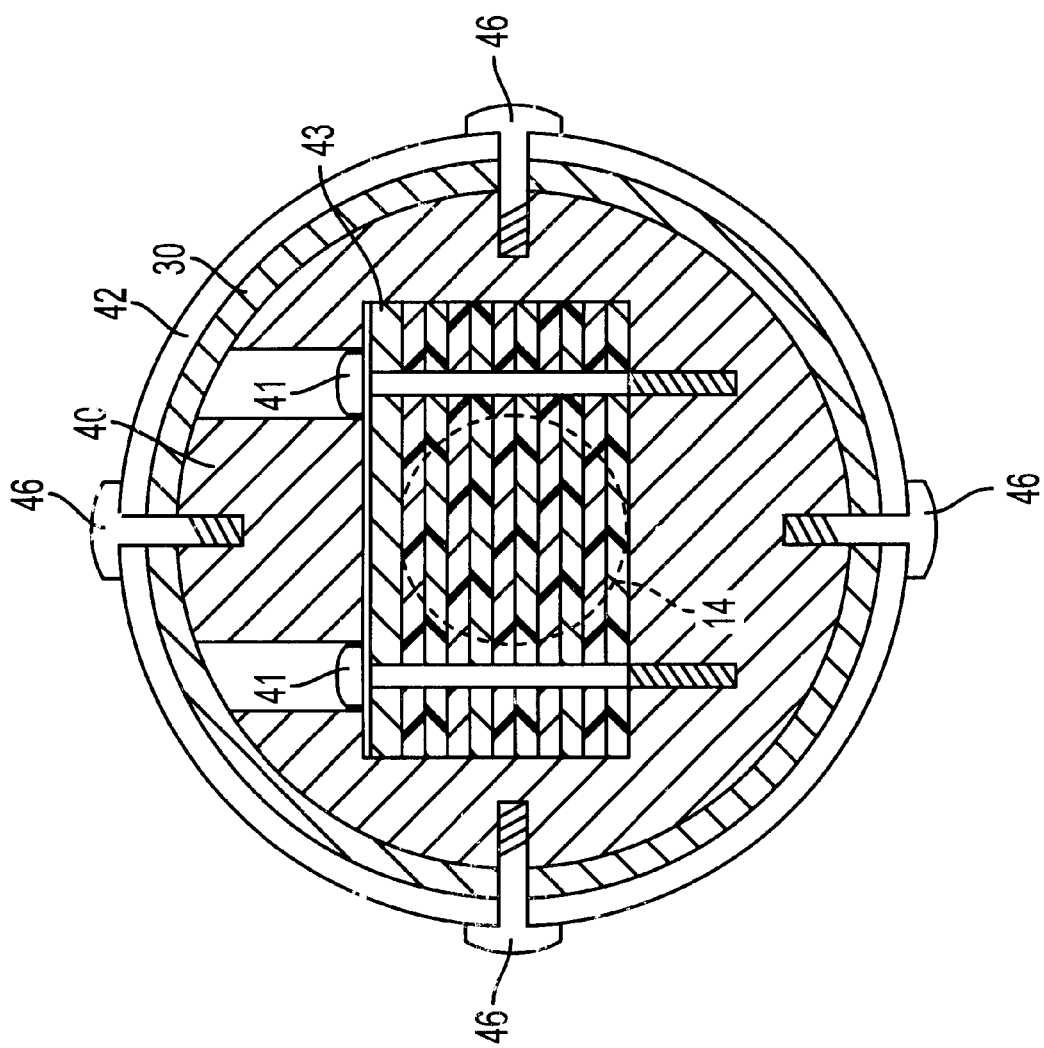
FIG. 6 is a cross-sectional view of a fixed end block taken substantially along line 6—6 of FIG. 5.

Referring to FIGS. 5 and 6, the fixed end 38 of the scintillator 12 may be rigidly held in an end block 40 such as by clamping. A pair of threaded fasteners 41 may be inserted through holes formed in the scintillator stack 12 to bear against a pressure bar 43. The holes in the scintillator stack 12 may be spaced laterally outside the area that is in operable contact with the photomultiplier tube 14 as shown in FIG. 6. It has been found that there is no significant degradation of efficiency of the scintillator 12 due to this interruption. The fixed ends 38 of the layers 18 may be polished smooth to provide a high refractive index. The fixed end of the casing 30 may be mechanically joined (at 42) to a separate housing 44 for the photomultiplier tube 14 and electronic amplifier 16.

Referring now particularly to FIG. 5, therein is shown an enlarged view of this connection between the flexible scintillator 12 with its flexible housing 30 and the housing 44 for the photomultiplier tube 14 and other electronics. In preferred form, the connector 42 is rigidly attached to the flexible housing 30 using fasteners, such as screws 46, which attach through the flexible housing 30 and directly into the end block 40. The connector 42 may also preferably include a threaded engagement 48 for rigid connection to an aluminum or other solid block 50 which comprises an end portion of the housing 44 and provides a rigid support for the photomultiplier tube 14. This end block 50 may also be attached with fasteners, such as screws 52, and may also include an o-ring seal 54, if desired.

The optical connection between the fixed end 38 of the scintillator bundle 12 and the photomultiplier tube 14 preferably includes a transparent elastomer pad 56 against which the photomultiplier tube is spring biased 58 for efficient operable optical connection. A preferred silicon elastomer material is SYLGARD® 184 manufactured by Dow Corning. This elastomeric connector 56 may be formed in situ, or may be preformed to the desired thickness and cut to shape.

Figure 2:
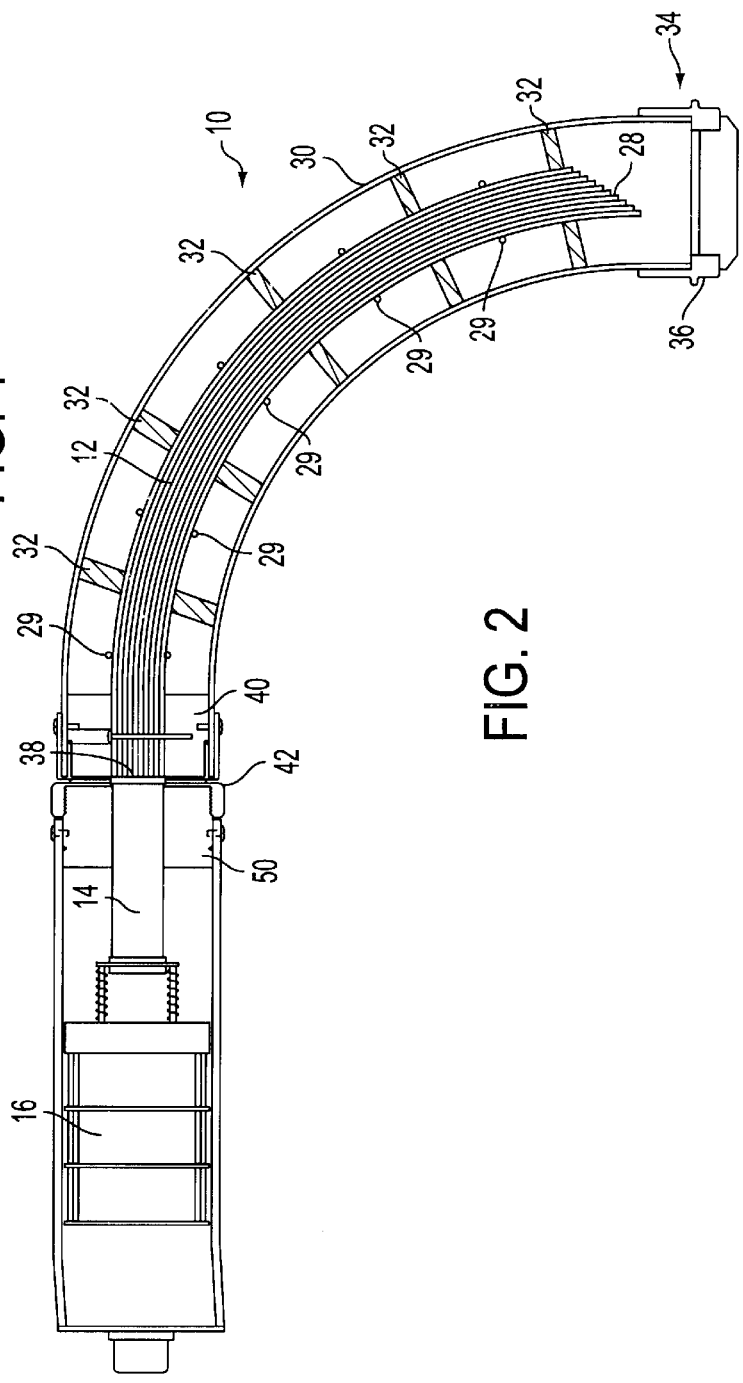
FIG. 2 is a longitudinal sectional view of a device like that shown in FIG. 1 wherein the flexible scintillator is shown in a bent position.
Figure 4:
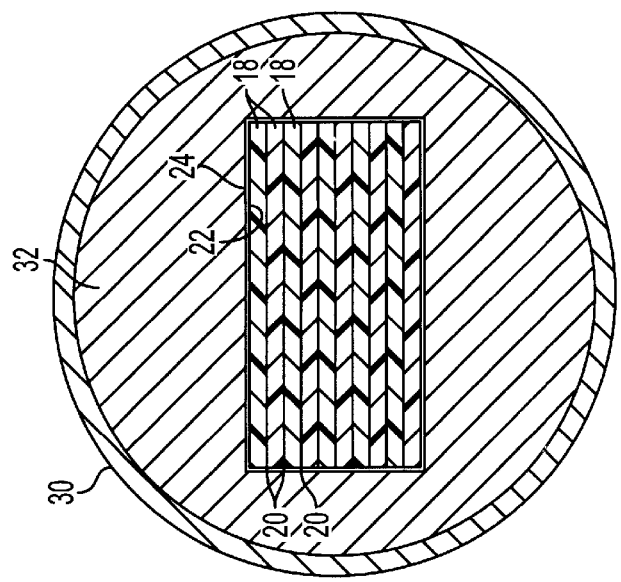
FIG. 4 is a cross-sectional view taken substantially along line 4—4 of FIG. 1.

Referring now also to FIG. 2, it can be seen that the laminate stack of the scintillator 12 is readily flexible in at least two dimensions. A bend radius of 12 inches or less is easily achieved. It can also be seen that there is some staggering of the free ends 28 of the laminate layers of the scintillator 12. While this may allow for an insignificant amount of light loss, ambient light is kept out due to the encapsulation provided by the flexible housing 30 and end cap 36.

By splicing together pieces of PVT in an end-to-end relationship, if necessary, a detector length of 14 feet or more may easily be achieved. Bends around one or more obstacles or around the curved body of a tank are easily achieved to produce an efficient and low cost nuclear level detector.

The embodiment shown is that which is presently preferred by the inventors. Many variations in the construction or implementation of this invention can be made without substantially departing from the spirit and scope of the invention. For this reason, the embodiment illustrated and described above is not to be considered limitive, but illustrative only. The scope of patent rights are to be limited only by the following claim or claims interpreted according to accepted doctrines of claim interpretation, including the doctrine of equivalence and reversal of parts.

What I claim is:

1. A flexible scintillator for a radiation-type level detector comprising:
    a plurality of elongated, relatively thin layers of plastic scintillator material, said plurality of elongated layers having first and second ends;
    said layers stacked in close proximity to one another in a slidable relationship; and
    the layers of at least one of said ends being aligned for operable connection to a photodetector.

2. A flexible scintillator according to claim 1, further comprising an antifriction material between layers of the plastic scintillator material.

3. A flexible scintillator according to claim 2, wherein the antifriction material includes a polytetrafluoroethylene film.

4. A flexible scintillator according to claim 1, wherein the plastic scintillator material includes polyvinyltoluene.

5. A flexible scintillator according to claim 4, further comprising an antifriction material between layers of the plastic scintillator material.

6. A flexible scintillator according to claim 5, wherein the antifriction material includes a polytetrafluoroethylene film.

7. A flexible scintillator according to claim 1, wherein edge and outer face surfaces of the layers of scintillator material are covered with an inwardly-facing light reflective material.

8. A flexible scintillator according to claim 7, wherein edge and outer face surfaces of the layers of scintillator material are covered with a light-excluding material over the light reflective material.

9. A flexible scintillator according to claim 1, further comprising a substantially light-tight flexible housing substantially covering the flexible scintillator.

10. A flexible scintillator according to claim 9, wherein the flexible housing has a spiral-wound construction.

11. A flexible scintillator according to claim 10, wherein the flexible housing includes a substantially light-tight outer thermoplastic sheath.

12. A flexible scintillator according to claim 9, wherein the flexible scintillator is spaced within the flexible housing by a series of longitudinally spaced apart spacer blocks.

13. A flexible scintillator according to claim 1, wherein an end of the stacked layers to be operably connected to a photodetector is rigidly fixed in an end block to hold an end portion of the stacked layers in substantially fixed alignment.

14. A flexible scintillator according to claim 13, further comprising a substantially transparent elastomer interface positioned at the at least one end aligned for operable connection to a photodetector as an interface between the scintillator and a photodetector.

15. A nuclear scintillation-type level detector with a flexible scintillator, comprising:
   a photodetector;
   a flexible scintillator comprising a plurality of elongated, relatively thin layers of plastic scintillator material, said layers stacked in close proximity to one another in a slidable relationship; and
   said elongated flexible scintillator having first and second ends, at least one of said ends being aligned for operable connection to said photodetector.

16. A level detector according to claim 15, further comprising an antifriction material between layers of the plastic scintillator material.

17. A level detector according to claim 16, wherein the antifriction material includes a polytetrafluoroethylene film.

18. A level detector according to claim 16, wherein edge and outer face surfaces of the layers of scintillator material are covered with a light-excluding material over the light reflective material.

19. A level detector according to claim 15, wherein the plastic scintillator material includes polyvinyltoluene.

20. A level detector according to claim 19, further comprising an antifriction material between layers of the plastic scintillator material.

21. A level detector according to claim 20, wherein the antifriction material includes a polytetrafluoroethylene film.

22. A level detector according to claim 15, wherein edge and outer face surfaces of the layers of scintillator material are covered with an inwardly-facing light reflective material.

23. A level detector according to claim 15, further comprising a substantially light-tight flexible housing substantially covering the flexible scintillator.

24. A level detector according to claim 23, wherein the flexible housing has a spiral-wound construction.

25. A level detector according to claim 24, wherein the flexible housing includes a substantially light-tight outer thermoplastic sheath.

26. A level detector according to claim 23, wherein the flexible scintillator is spaced within the flexible housing by a series of longitudinally spaced apart spacer blocks.

27. A level detector according to claim 15, wherein an end of the stacked layers to be operably connected to a photodetector is rigidly fixed in an end block to hold an end portion of the stacked layers in substantially fixed alignment.

28. A level detector according to claim 27, further comprising a substantially transparent elastomer interface positioned at the at least one end aligned for operable connection to a photodetector as an interface between the scintillator and a photodetector.

* * * * *